Sept. 2, 1924.
G. L. SMITH
1,507,438
BRAKE BAND SUPPORT
Filed Jan. 31, 1924
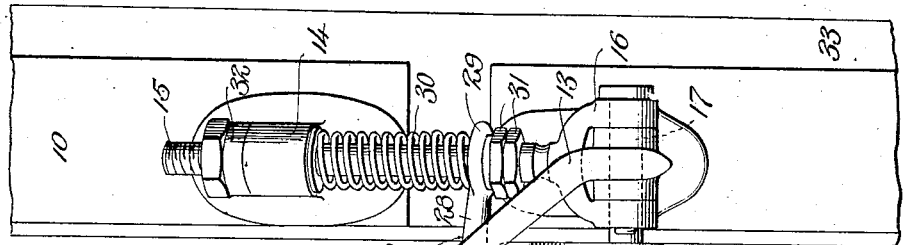
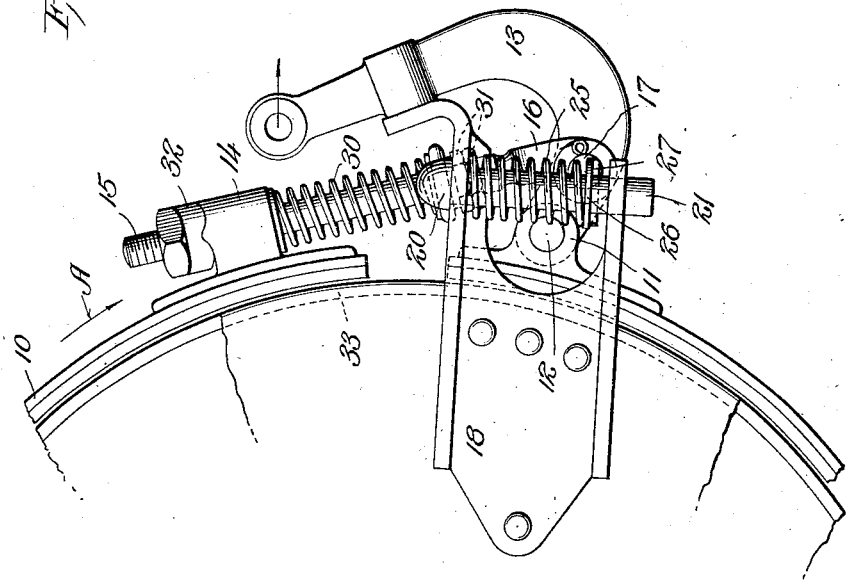
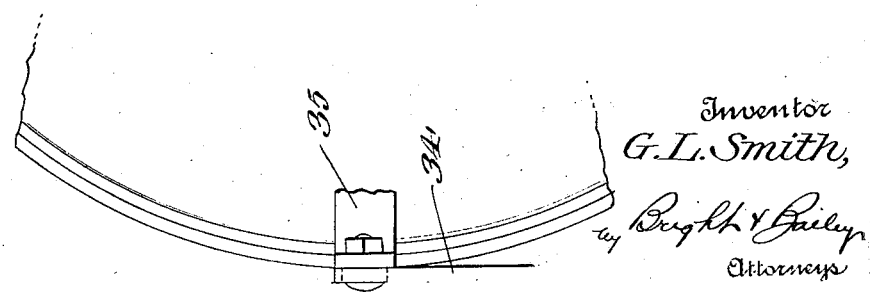

Patented Sept. 2, 1924.

1,507,438

UNITED STATES PATENT OFFICE.

GEORGE L. SMITH, OF WASHINGTON, DISTRICT OF COLUMBIA, ASSIGNOR TO UNITED STATES ORDNANCE COMPANY, OF WASHINGTON, DISTRICT OF COLUMBIA, A CORPORATION OF VIRGINIA.

BRAKE-BAND SUPPORT.

Application filed January 31, 1924. Serial No. 689,743.

*To all whom it may concern:*

Be it known that I, GEORGE L. SMITH, a citizen of the United States, and resident of Washington, in the District of Columbia, have invented certain new and useful Improvements in Brake-Band Supports, of which the following is a specification.

The object of my invention is to provide adequate means for the support of the brake band of an automobile and the mechanism carried by the free ends thereof for applying the brake pressure while at the same time permitting rotation of the band and its associated mechanism for the purposes of equalization of the braking effect as fully described and claimed in my Letters Patent 1,440,842.

In the drawings chosen to illustrate my invention the scope whereof is set forth in the claims, Figure 1 shows a side view of a brake structure embodying my invention; and Figure 2, a front view of same.

Referring now to the drawings in detail 10 designates the brake band, 11 the lug riveted to the lower end of the band 10 and carrying a pivot 12 to which the brake lever 13 is pivoted all in the usual manner of construction. 14 designates a lug secured to the upper end of the band 10 for the reception of a bolt 15 having at its lower end a clevis 16 which is pivoted to the lever 13 as at 17.

A bracket 18 is secured to a fixed part of the axle and carries an L-shaped support 20 having a vertical stem 21 slidably mounted in bearings 22 and 23 in the bracket 18. A shoulder 24 limits the downward movement of this support 20 and its upward movement is resisted by a spring 25 which abuts against the bearing 22 at its upper end and against a washer 26 at its lower end, this washer being secured to the stem 21 by a cotter pin 27.

The horizontal arm 28 of the support 20 terminates in an eye 29 through which the bolt 15 passes and this eye is utilized in a manner similar to the usual fixed eye provided for the support of the parts under consideration, as follows.

A spring 30 carried on the bolt 15 is supported at its lower end by the eye 29 and presses against the lug 14 at its upper end. The adjusting nuts 31 carried by the bolt 15 bear against the under side of the eye 29 and are held in contact therewith by the action of the spring 30 on the lug 14 which in turn supports the nut 32 on the bolt 15. Adjustment of the band 10 is made in the usual manner by proper setting of the nuts 31 and the band adjusting nut 32 since tightening of the nut 32 draws the upper half of the band 10 down into closer proximity to the brake drum 33 and lowering of the nuts 31 on the bolt 15 allows the lower half of the band to be drawn up in like manner by the action of the spring 30. It is thus seen that my mechanism does not change in any way the conventional method of brake band adjustment in general use.

The mechanism operates as follows: Should the band be rotated in the direction of the arrow A, the lugs 11 and 14, the lever 13 and the bolt 15 would travel downward and the spring 30 would be compressed, since its lower end abuts against the eye 29.

Should the band be rotated in the opposite direction the various parts would move upward and the nuts 31 bearing against the under side of the eye 29 would exert an upward pressure against it and cause the support 20 to move upward thereby compressing the spring 25. It is thus evident that the band 10 can rotate in either direction and that such rotation will compress either the spring 30 or spring 25 as the case may be and that when the force causing such rotation is released, these springs will return the band to its initial position. It is also evident that the support 20 will follow slight lateral displacements of the bolt 15, since it can turn freely on its stem 21 and that it provides a non-resisting support for the lower end of the spring 30 whereby up and down movement of the band due to vibrations and road shocks cannot take place without overcoming the forces of the two springs 25 and 30.

It will be observed that the previously described construction is particularly designed for association in a brake system embodying my braking effect equalizing mechanism as set forth in my prior Patent 1,440,842 and wherein the brake bands are adapted to rotate with their respective drums subject to the limitations imposed by the mechanism. I have herein shown a fragment of such braking effect equalizing mechanism as embodying a bell crank 34 which is pivoted at separated points to the brake band 10 and a bracket 35 which extends from and is fixed to the axle casing (not shown) of an automobile, whereby the band 10, under certain conditions, is capable of limited rotation with the drum 33, all as fully described and claimed in my aforesaid patent.

I claim:—

1. In a brake structure, a brake band adaptable for rotary movement in either direction, a toggle mechanism for contracting the band, and means for yieldingly resisting rotary movement of the band in either direction, said means including spring elements mounted on and independently of the toggle mechanism respectively.

2. In a brake structure, a brake band adapted for rotary movement in either direction, a toggle mechanism for contracting the band, a spring mounted on said mechanism normally expanding the band, a supporting member with which said spring coacts to yieldingly resist rotation of the band in one direction, said supporting member being movable with said toggle mechanism upon rotation of the band in the opposite direction, and means mounted independently of the toggle mechanism operating to yieldingly resist said movement of the supporting member.

3. In a brake structure, a brake band adapted for rotary movement in either direction, a toggle mechanism for contracting the band, a spring included in said mechanism normally expanding the band, a supporting member immovably coacting with the spring to effect yielding resistance to rotation of the band in one direction and movable with said toggle mechanism upon rotation of the band in the opposite direction, and means mounted independently of the toggle mechanism operating to yieldingly resist said movement of the supporting member.

4. In a brake structure, a brake band adapted for rotary movement in either direction, a toggle mechanism for operating the band including a spring to normally expand the band, a supporting member having one movement from an initial position and forming a rigid abutment when in said initial position from which said spring reacts to yieldingly resist rotation of the band in one direction, means operated by opposite rotation of the band to move said member from its initial position, and means mounted independently of the toggle mechanism yieldingly resisting movement of said member from its initial position.

5. In a brake structure, a brake band adapted for rotary movement in either direction, a toggle mechanism for contracting the band including a spring to normally expand the band, a supporting member having one movement from an initial position and coacting in its initial position with said spring to effect yielding resistance to rotary movement of the band in one direction, said member being movable from said initial position by rotary movement of the band in the opposite direction, and a second spring yieldingly resisting movement of the supporting member from its initial position.

6. In a brake structure, a brake band adapted for rotary movement in either direction, a member movable from an initial position by rotation of the band in one direction, and a pair of springs one of which reacts from the member to yieldingly resist rotation of the band in the opposite direction and the other operating to yieldingly resist movement of the member from its initial position.

7. In a brake mechanism, a brake band, a toggle mechanism for contracting the band, a supporting member movable in one direction only from an initial position, a band expanding spring on said toggle mechanism supported by said member, a stop on said toggle mechanism engaging said supporting member and limiting expansion of said band under the action of said spring, and a second spring resisting movement of said supporting member from its initial position.

8. In a brake structure, a brake band adapted for rotation in either direction, a toggle mechanism for contracting the band and including a brake lever and a bolt connecting the lever with one end of the band, a stop on said bolt, a release spring on the bolt between the stop and band, a bracket, a supporting member slidably engaged in said bracket and having one end slidably engaged with the bolt between the stop and release spring to support the latter, and means between the bracket and supporting member yieldingly holding the latter against movement in one direction.

In testimony whereof I hereunto affix my signature.

GEORGE L. SMITH.